Nov. 27, 1923
Re. 15,725
S. S. BONEL
VEHICLE BODY CONSTRUCTION AND UPHOLSTERY THEREFOR
Original Filed July 15, 1918 2 Sheets-Sheet 1
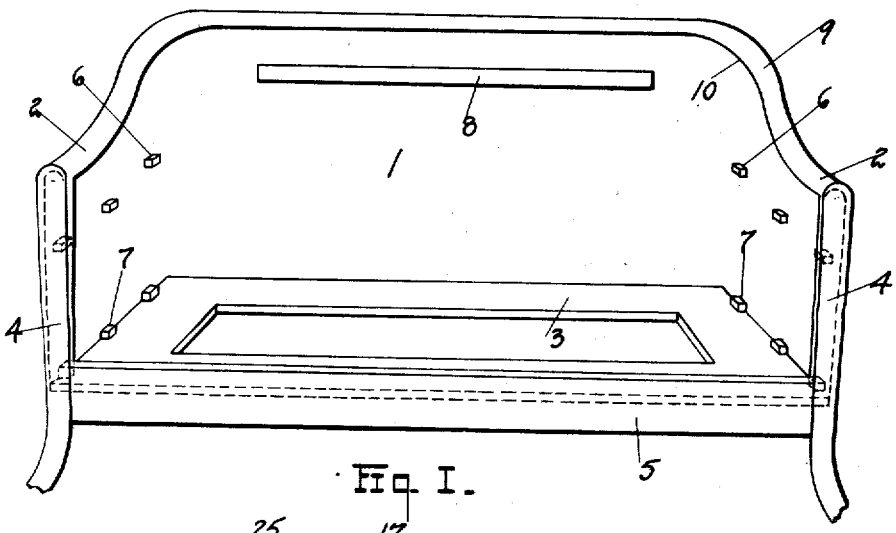
Fig. I.
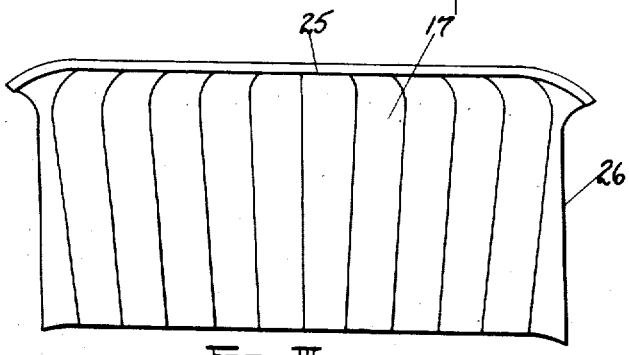
Fig. III.
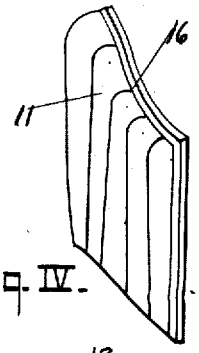
Fig. IV.
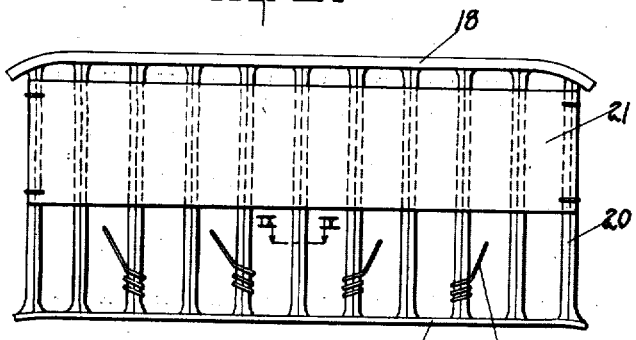
Fig. V.
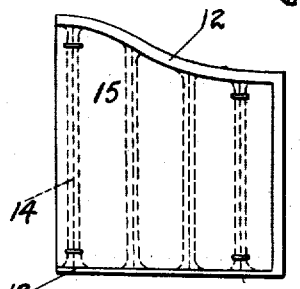
Fig. VI.
INVENTOR.
Spiro S. Bonel
BY Owen Owen & Crampton,
ATTORNEYS.

Nov. 27, 1923 Re. 15,725
S. S. BONEL
VEHICLE BODY CONSTRUCTION AND UPHOLSTERY THEREFOR
Original Filed July 15, 1918 2 Sheets-Sheet 2
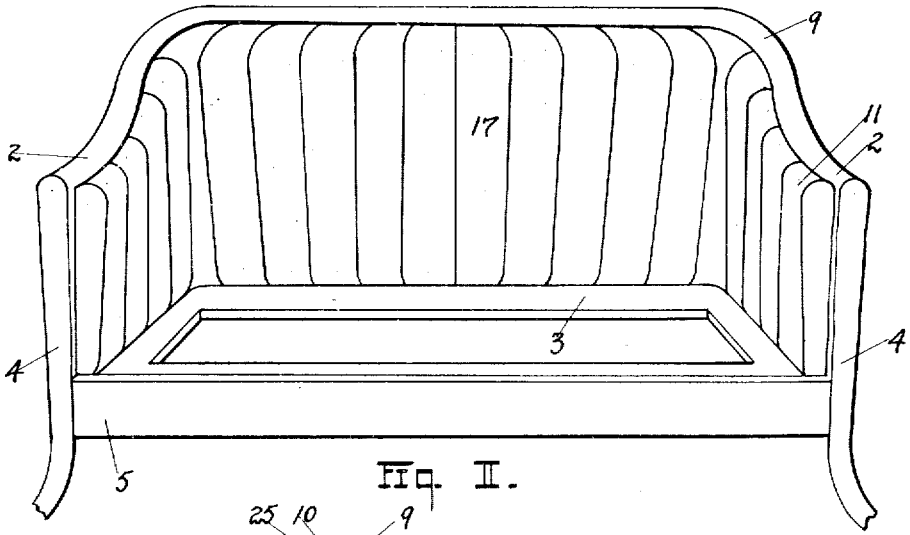
Fig. II.
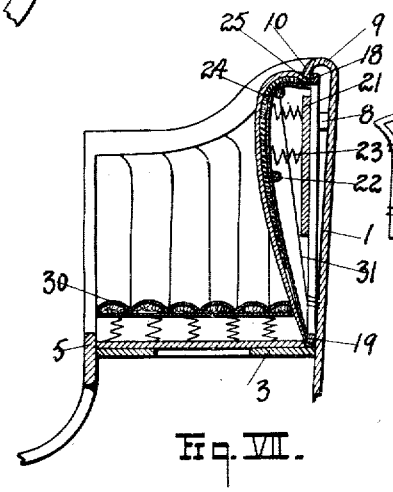
Fig. VII.
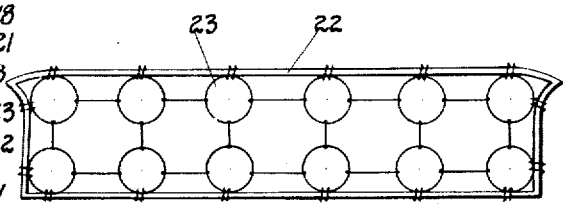
Fig. VIII.
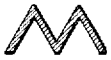
Fig. IX.
INVENTOR.
Spiro S. Bonel
BY Brown Brown & Crampton,
ATTORNEYS.

Reissued Nov. 27, 1923. Re. 15,725

UNITED STATES PATENT OFFICE.

SPIRO S. BONEL, OF DETROIT, MICHIGAN, ASSIGNOR, BY MESNE ASSIGNMENTS, TO THE WILLYS-OVERLAND COMPANY, OF TOLEDO, OHIO, A CORPORATION OF OHIO.

VEHICLE BODY CONSTRUCTION AND UPHOLSTERY THEREFOR.

Original No. 1,303,535, dated May 13, 1919, Serial No. 244,896, filed July 15, 1918. Application for reissue filed September 27, 1920. Serial No. 413,185.

*To all whom it may concern:*

Be it known that I, SPIRO S. BONEL, residing at Detroit, county of Wayne, State of Michigan, have invented certain new and useful Improvements in Vehicle Body Construction and Upholstery Therefor, of which I declare the following to be a full, clear, and exact description.

This invention relates to body construction and upholstery for vehicles and its object is to provide an all metal body dispensing with the usual wooden frame members to which the upholstery is secured and on which the metal body is usually mounted. The principal features of this invention reside in the construction of the metal body and provision for upholstery in the form of separable units that may be removed from the body for cleaning purposes and readily secured in place in the body. By dispensing with the usual wooden frame members the manufacturing expense is reduced and a light weight body is secured. These objects and the several novel features of the invention are hereinafter more fully described and claimed and shown in the preferred form in the accompanying drawings in which:—

Figure I is a perspective view showing a portion of the rear seat of an automobile with the upholstery removed.

Figure II is a similar view showing the upholstering in place.

Figure III is an elevation of the upholstery unit for use in the back of the seat member.

Figure IV is a detail in perspective of a complete upholstery unit used on the end of the seat member.

Figure V is a detail of the framework for the back member shown in Figure III.

Figure VI is an elevation of the frame member for the upholstery unit shown in Figure IV.

Fig. VII is a central cross section of the seat showing the upholstery units in place.

Figure VIII is a detail of the spring member used in the rear unit.

Figure IX is a cross section of a member of the frame shown in Figure V, the section being taken on the line IX—IX.

In an automobile construction the back of the body forms the rear seat member and likewise the forward seat member is usually of metal supported on a wooden framework. By reason of the form of the seat members and body of the vehicle the metal member of itself is of sufficient strength without the use of the framework, and no necessity for use of such framework would exist if the upholstery could be secured on this metal body or seat member. To accomplish this purpose, therefore, I have devised the metal body of the vehicle, or the seat member as here shown, of a shape adapted to receive upholstering in the form of independent cushion members or units readily detachably relative to the metal body or seat. I have here shown only a seat member and it is to be understood that the principle involved may be utilized in any part of the body in which upholstery or finishing of any character is utilized. In the seat member, as shown for instance in Figure I, the back 1 may be of any desired shape, either curved as is usual at the back or straight as is shown in Figure VII. Integral with the back portion are side or end portions 2 terminating at the forward edge of the seat board 3 in the vertical portions 4 providing door posts or, if no door is utilized at this particular point, extending forward to such door opening. Extending between these terminals 4 of the seat portion is a bar or retainer 5 projecting slightly above the seat frame 3 as indicated. A series of lugs 6 and 7 are positioned on each side member 2 and a bar 8 is secured to the back of the body 1 providing supports for the upholstering units as hereinafter described. The upper edge of the back and side members is turned as shown in the form of a roll 9 having a slightly depending inner edge 10 behind which a portion of the upholstery units engage as hereinafter shown.

For the side or end portions 2 of the seat, I have provided an upholstering unit 11 shown in Figure IV having a shape conforming to the shape of said end. This unit is formed of a frame member as shown in Figure VI comprised of the upper and lower metal bars 12 and 13 and cross bars 14 shown by dotted lines. On these bars is secured a flat cardboard or fiber member 15 which supports the padding used in the upholstering and the exterior cover member of the upholstering is secured to said back and frame member in such manner as to provide a projecting ledge or shoulder member 16 at the upper edge and for this purpose the outer cover member of the upholstering member may be wrapped tightly about the bar 12 of the frame and over the padding so that the frame member is entirely covered. This ledge or shoulder 16 engages behind the edge 10 of the seat member when the side unit is placed in position against the lugs 6 and 7 secured to the body. These lugs are so positioned as to support the vertical bars 14 of the frame when the unit is in place and to place the unit in position I first insert the upper ledge 16 beneath the flange 10 and then move the lower edge to bring the unit to substantially vertical position.

The back upholstering unit 17 shown in Fig. III is formed on the frame shown in Fig. V having the upper and lower horizontal members 18 and 19 connected by the vertical bars 20 similar to the bars 14 of the frame shown in Fig. VI. On these bars 20 of the back unit is secured a fiber or cardboard member 21 providing a support for the springs which are used in the back as shown in Fig. VII. The springs are preferably made up on a frame 22 substantially rectangular in shape, and encircling and secured to the springs 23 at one end thereof as shown in Fig. VII. The springs are the usual coiled springs used in upholstering and the forward or frame ends thereof engage the upholstering and padding 24, and at their rear ends engage against the cardboard member 21. The external covering of the upholstering is stretched over the frame and spring members and is preferably wrapped about the upper longitudinal member 18 of the frame to provide a ledge or shoulder 25 in Fig. III corresponding in shape to the shape of the bar 18. This unit 17 has the ends curved as indicated at 26 conforming to the external shape of the upholstering at the rear end of the member 11 shown in Fig. IV. When the two end members 11 are in place on the end portions 2 of the seat, the rear member is then positioned by first inserting the shoulder 25 beneath the flange 10 of the back then moving the lower edge back into contact with the back member. The bar 8 extending across the back 1 of the seat is engaged by the frame of the unit as shown in Fig. VII and the ledge 25 is, by means of this bar, brought forcibly into contact with the flange 10 as will be understood from Fig. VII. The end of the back unit corresponds in form to the upholstering of the unit 11 and covers the rear end thereof as will be understood from Fig. II. By use of the lugs 6 and 7 the side units are spaced from the metal body in which space the bars for the vehicle top (not here shown) may be secured.

When the side units and back units are positioned with the upper edges engaging behind the inner edge 10 of the roll 9 the seat cushion member 30 is placed on the seat board 3 with the forward edge of the cushion engaging behind the upper edge of the bar or retainer 5 as will be readily understood from Fig. VII. This cushion member 30 engages the lower ends of the units 11 and 17 holding the said lower ends in the designed position and preventing displacement thereof. All the members are readily removable by simply first removing the seat cushion, then the back unit 17 by drawing the lower edge thereof forward to allow the upper ledge member 25 to be withdrawn from engagement behind the flange 10, then the end members 11 may be removed in like manner.

Preferably the spring frame shown in Fig. V is held in place with the springs in engagement with the member 21 of the frame by means of the sustaining members 31 which are simply members formed of about number eight gage wire having their lower ends wrapped about the vertical bars 20 shown in Fig. V and the upper ends engaging about the upper horizontal bar of the frame 22 as will be understood from Fig. VII. The bars 14 and 20 are preferably of sheet metal corrugated or bent practically as shown in Fig. IX. This method of support of the spring member does not in any way interfere with the freedom of movement of the springs in compression or expansion and yet holds the spring member securely in the desired position. This cushion member however, may be made of any approved type of spring members or character of upholstering, the essential characteristic of the invention being the construction of the upholstering in units removably secured to the metal body or seat member as hereinbefore described.

Having thus briefly described my invention, what I claim is—

1. In a vehicle body construction in combination, a metal body member provided with an inturned flange having a continuous depending edge, and upholstery therefor comprising separate units each of a shape conforming to the shape of a particular portion of the body member, each unit having a portion thereof adapted for insertion behind the depending edge of the flange, a spacing member for each upholstery unit secured to the body member near the upper edge, the body member having a seat portion, and a cushion for said seat adapted to engage the said units at the bottom to hold the same in engagement with the respective spacing members and depending flange.

2. In a vehicle body construction, in combination, a metal body member shaped to provide a seat, the upper edge of the said seat portion having an inturned depending flange spaced from the main portion, and upholstery therefor comprising separate complete units, each shaped to conform to the shape of the ends and back respectively of the said seat portion, the back portion being shaped at the ends to engage over the rear ends of the said end units, each of the said units being provided at the upper rear edge with a shoulder adapted to engage behind the said depending flange of the body, and a seat cushion engaging the lower edges of the said units when in position.

3. In a vehicle body construction, in combination, a metal body member shaped to provide a seat, the upper edge of the said seat portion having an inturned depending flange spaced from the main portion, and upholstery therefor comprising separate complete units, each shaped to conform to the shape of the ends and back respectively of the said seat portion, the back portion being shaped at the ends to engage over the rear ends of the said end units, each of the said units being provided at the upper rear edge with a shoulder adapted to engage behind the said depending flange of the body, and a seat cushion engaging the lower edges of the said units when in position, and a retainer bar across the front of the seat preventing accidental displacement of the seat cushion.

4. In a vehicle body construction, in combination, a metal body member shaped at the upper edge to provide a depending flange on the inner side, separate upholstery units each shaped to conform to the shape of a portion of the said body member and having a flange or shoulder provided at the rear upper edge to engage behind the said body flange, spacing members on the body in position to engage the respective units near the upper ends thereof to space the said upper ends from the main portion of the body, and a seat cushion engaging the lower ends of the units in a manner to force them into position against the spacing members and in binding relation with the said body flange.

5. In a vehicle body construction in combination, a metal body member shaped to provide a seat portion, the metal being return bent along the upper edge providing a depending flange, and upholstery units therefor comprising separate upholstered metal frame members each fitting a specific portion of the body member, one edge of the frame being adapted to engage behind the flange of the body, the upholstered end frames of the seat being engaged by the ends of the back frame for the seat, and a seat cushion engaging the lower edges of the upholstered frames to hold the said frames in position in engagement with the body flange.

6. In a vehicle body construction, in combination, a body member provided with an inturned flange having a continuous depending edge, and upholstery therefor comprising separate units each of a shape conforming to the shape of a particular portion of the body member, each unit having a portion thereof adapted for insertion behind the depending edge of the flange, means for spacing each upholstery unit away from the body member, and means to engage the lower edges of the upholstery units to cause the same to bear upon the body member through the respective spacing members and against the said depending flange.

7. In a vehicle body construction, in combination, a body member shaped at the upper edge to provide a depending flange on the inner side, separate upholstery units each shaped to conform to the shape of a portion of the said body member and having a flange or shoulder provided at the rear upper edge to engage behind the said body flange, spacing members in position to engage the respective units to space the said upper ends from the main portion of the body, and means to engage the lower edges of the upholstery units to cause the same to bear upon the body member through the respective spacing members and against said depending flange.

8. In vehicle body construction, in combination, a body member shaped at the upper edge to provide a depending flange on the inner side, separate upholstery units each shaped to conform to the shape of a portion of the said body member and having a flange or shoulder provided at the rear upper edge to engage behind the said body flange, spacing members on the body in position to engage the respective units near the upper ends thereof to space the said upper ends from the main portion of the body, and means to engage the lower edges of the upholstery units to hold the same in engagement with the respective spacing members and depending flange.

9. In vehicle body construction, in combination, a body member shaped to provide a seat portion having a depending flange along its upper edge, and upholstery units therefor comprising separate frame members each fitting a specific portion of the body member, one edge of each frame being adapted to engage behind the flange of the body, the upholstered end frames of the seat being engaged by the ends of the back frame for the seat, and means engaging the lower edges of the upholstered frames to hold the said frames in position.

10. In a vehicle body construction, in combination, a body member shaped to provide a seat, the upper edge of said seat portion having an inturned depending flange spaced from the main portion, and upholstery therefor comprising separate units shaped to conform to the shape of the ends and back respectively of the said seat portion, the back unit being adapted to engage the rear ends of the end units, each of the said units being adapted to extend behind said depending flange of the body, and means engaging the lower edges of the said units when in operative position.

11. In a vehicle body construction, in combination, a body member shaped to provide a seat, the upper edge of said seat portion having an inturned depending flange spaced from the main portion, and upholstery therefor comprising separate units shaped to conform to the shape of the ends and back respectively of the said seat portion, the ends of the back unit being adapted to engage the rear ends of the end units, each of said units being adapted to engage behind the said depending flange of the body, a seat cushion engaging the lower edges of the said units when in position, and retaining means at the front of the seat preventing accidental displacement of the seat cushion.

12. In vehicle body construction, in combination, a body member provided with an inturned flange having a depending edge, an upholstery unit therefor having a portion adapted for insertion behind the depending edge of the flange, means for spacing said unit slightly from the body member, and means for holding the lower edge of said unit in operative position.

13. In vehicle body construction, in combination, a body member shaped to provide a seat, said body member having an inturned flange at its upper edge, upholstery therefor comprising separate units each of a shape conforming to the shape of a particular portion of the body member, co-acting means for locking said flange and upholstery units together, said means adapted to be disconnected by movement of the lower edges of the said units outward and downward, a spacing member for each upholstery unit secured to the body member near the upper edge, the body member having a seat portion, and a cushion for said seat adapted to engage the said units at the bottom to hold the same in engagement with the respective spacing members and to hold the said locking means in operative position.

14. In vehicle body construction, in combination, a body member shaped to provide a seat, said body member having an inturned flange at its upper edge, separate upholstery units comprising separate frame members each fitting a specific portion of the body member, co-acting means on the flange and frame members for locking said flange and frame members together, said means adapted to be disconnected by movement of the lower edges of the said frame members outward and downward, the upholstered end frames of the seat being engaged by the ends of the back frame for the seat, and a seat cushion engaging the lower edges of the upholstered frames to hold the said frames in position and to hold said locking means in operative position.

15. In vehicle body construction, in combination, a body member shaped to provide a seat, said body member having an inturned flange at its upper edge, upholstery therefor comprising separate units each of a shape conforming to the shape of a particular portion of the body member, co-acting means on said flange and units for locking the same together, said means being adapted to be disconnected by movement of the lower edges of said units outward and downward, means for spacing each upholstery unit away from the body member, the latter having a seat portion, and a cushion for said seat adapted to engage the said units at the bottom to cause the same to bear upon the body member through the respective spacing members and to hold the said locking means in engagement.

16. In vehicle body construction, in combination, a body member shaped to provide a seat, said body member having an inturned flange at its upper edge, upholstery therefor comprising separate units each of a shape conforming to the shape of a particular portion of the body member, co-acting means on said flange and units for locking the same together, said means being adapted to be disconnected by movement of the lower edges of the said units outward and downward, means for spacing each upholstery unit away from the body member, and means to engage the lower edges of the upholstery units to cause the same to bear upon the body member through the respective spacing members and against the said depending flange.

17. In a vehicle body construction, in combination a body member shaped to provide a seat, said body member having an inturned flange at its upper edge, upholstery units therefor comprising separate frame members, each fitting a specific portion of the body member, co-acting means on said flange and units for locking the same together, said means being adapted to be disconnected by movement of the lower edges of the said units outward and downward, the upholstered end frames of the seat being engaged by the ends of the back frame for the seat, and means engaging the lower edges of the upholstered frames to hold the said frames in position.

18. In vehicle body construction, in combination, a body member shaped to provide a seat, said body member having an inturned flange at its upper edge, an upholstery unit therefor, co-acting interlocking means on said flange and on the upper edge of said unit, said means being adapted to be disconnected by movement of the lower edge of said unit outward and downward, means for spacing said unit slightly from the body member, and means for holding the lower edge of said unit in operative position.

19. In a vehicle body construction, a panel comprising a transverse portion having angularly disposed end portions, the extremities of which are turned inwardly together with the upper edge of the panel, upholstery units for the end portions of said panel having their forward edges disposed behind said inturned extremities and their upper edges disposed beneath the upper inturned edge of the panel and an intermediate upholstery unit disposed upon the transverse portion of the panel with its upper edge beneath the inturned edge portion thereof.

20. In a vehicle body construction, an upright panel for supporting upholstery comprising a transverse portion having angularly disposed end portions, the extremities of which are grooved to receive the forward edges of the upholstery, means at the upper edge of the panel for retaining the upper edges of the upholstery and a ledge disposed upon the wall of the panel and adapted to receive the lower edges of the upholstery.

21. In a vehicle body construction, an upright panel for supporting upholstery comprising a transverse portion having angularly disposed end portions, the extremities of which are turned inwardly and rearwardly to receive the forward edges of the upholstery, the upper edge of said panel being turned inwardly and downwardly to receive the upper edge of the upholstery, and means disposed upon the vertical wall of said panel forming a support for the lower edge of the upholstery.

22. In a vehicle body construction, an upright panel for supporting upholstery comprising a transverse portion having angularly disposed end portions, the extremities of which are turned inwardly and rearwardly to receive the forward edges of the upholstery, the upper edge of said panel being turned inwardly and downwardly to receive the upper edge of the upholstery, and a seat board disposed directly upon said panel and serving as a support for the lower edge of the upholstery.

23. In a vehicle body construction, an upright panel for supporting upholstery comprising a transverse portion having angularly disposed end portions, the extremities of which are constructed to afford door posts for the side doors of the vehicle, said door posts being formed with rearwardly opening grooves to receive the forward edge of the upholstery to prevent displacement of the same.

24. In a vehicle body construction, an upright panel for supporting upholstery comprising a transverse portion having angularly disposed end portions, the extremities of which are constructed to afford door posts for the side doors of the vehicle, said door posts being formed with rearwardly opening grooves in a manner to receive the forward edges of the upholstery, said panel being provided at its upper edge with an inwardly extending and downwardly turned flange adapted to engage the upper edge of the upholstery to retain the same upon the panel.

25. In a vehicle body construction, a panel comprising a transverse portion having angularly disposed end portions, a bar between said end portions tying the same together and a frame for supporting upholstery having its forward edge carried by said bar and its rear edge at a distance above the base of the panel carried by the vertical wall of the panel.

26. In a vehicle body construction, a panel for upholstery comprising a transverse portion having angularly disposed end portions, the upper edges of said portions being turned inwardly to receive the upper edges of the upholstery, a bar between said end portions tying the same together, and a seat frame located at a distance above the base of the panel having its forward edge secured to said bar and its rear edge secured to the vertical wall of the panel, said frame forming a ledge adapted to support the lower edges of the upholstery.

SPIRO S. BONEL.

Certificate of Correction.

It is hereby certified that in Reissue Letters Patent No. 15,725, granted November 27, 1923, upon the application of Spiro S. Bonel, of Detroit, Michigan, for an improvement in "Vehicle Body Construction and Upholstery Therefor," an error appears in the printed specification requiring correction as follows: Page 5, lines 86 and 87, claim 25, strike out the words "at a distance above the base of the panel" and insert the same to follow after the syllable "stery" in line 85; and that the said Letters Patent should be read with this correction therein that the same may conform to the record of the case in the Patent Office.

Signed and sealed this 18th day of March, A. D., 1924.

[SEAL.]

KARL FENNING,
*Acting Commissioner of Patents.*